(12) United States Patent
Pingilley et al.

(10) Patent No.: US 6,953,142 B2
(45) Date of Patent: Oct. 11, 2005

(54) METHOD AND APPARATUS FOR LOCATING AND HOLDING A FLANGE

(75) Inventors: John D. Pingilley, Bettendorf, IA (US); Roger W. Christensen, Bettendorf, IA (US); Njell J. Cooley, Davenport, IA (US); Michael J. McCreary, Davenport, IA (US); Don Stabenow, St. Olaf, IA (US); John D. Hogue, Port Byron, IL (US)

(73) Assignee: GSG, LLC, Davenport, IA (US)

( * ) Notice: Subject to any disclaimer, the term of this patent is extended or adjusted under 35 U.S.C. 154(b) by 150 days.

(21) Appl. No.: 10/654,089

(22) Filed: Sep. 2, 2003

(65) Prior Publication Data

US 2005/0045689 A1 Mar. 3, 2005

(51) Int. Cl.⁷ .......................... B23K 1/18; B23K 37/04; B23K 37/00
(52) U.S. Cl. ................... 228/49.3; 228/44.3; 228/44.5; 228/49.1; 285/27; 285/31
(58) Field of Search ............................... 228/4.1, 44.3, 228/44.5, 47.1, 49.1–49.3, 49.6; 285/27, 31

(56) References Cited

U.S. PATENT DOCUMENTS

| | | | | |
|---|---|---|---|---|
| 2,645,506 A | * | 7/1953 | Sturgis | 285/310 |
| 3,516,688 A | * | 6/1970 | Gachot | 285/31 |
| 3,551,636 A | * | 12/1970 | Nelson | 219/124.33 |
| 3,558,161 A | * | 1/1971 | Bormioli | 285/27 |
| 3,634,648 A | * | 1/1972 | Morris et al. | 219/60 A |
| 4,715,625 A | * | 12/1987 | Shows et al. | 285/123.11 |

* cited by examiner

Primary Examiner—Lynne R. Edmondson
(74) Attorney, Agent, or Firm—McKee, Voorhees & Sease, P.L.C.

(57) ABSTRACT

Apparatus for locating and grasping a flange include a plurality of clamp arms that move from an unclamped position to a clamped position, clamping the flange to the upper surface of a support platform. A plurality of pins are adapted to move upwardly into flange holes within the flange for positioning the flange during the clamping action. The locating and the clamping of the flange to the upper surface of the support platform are accomplished by a single pusher rod that is connected to both the pins and the clamps. The method comprises using a single pusher rod connected to both the pins and the clamps for locating and clamping the flange to the upper surface of a platform.

13 Claims, 7 Drawing Sheets

METHOD AND APPARATUS FOR LOCATING AND HOLDING A FLANGE

BACKGROUND OF THE INVENTION

The present invention relates to a method and apparatus for locating and holding a flange.

In the manufacturing of vehicles an important task involves the welding of a pipe such as an exhaust pipe to a flange. In order to do this task robotically, it is necessary to locate the position of the flange and to clamp it tightly during the welding process. Prior art methods have accomplished this process with two steps. The first step involves using locating pins to locate the flange and properly position it. The second step is to clamp the flange in position so that it is held stationary during the welding process.

Therefore a primary object of the present invention is the provision of an improved method and apparatus for locating and holding a flange.

A further object of the present invention is the provision of a method and apparatus for locating and holding a flange with a single movement that both locates and clamps the flange in one step.

A further object of the present invention is the provision of an improved method and apparatus for locating and holding a flange which utilizes pivotal clamps that cam into position for clamping the flange to a support platform.

A further object of the present invention is the provision of an improved method and apparatus for locating and holding a flange which can be actuated by either a toggle, a pneumatic or hydraulic cylinder, or other prime movers.

A further object of the present invention is the provision of a method and apparatus for locating and holding a flange which can be easily adapted for use in robotics to permit the welding of a pipe to the flange.

A further object of the present invention is the provision of a method and apparatus for locating and holding a flange which is economical to manufacture, durable in use, and efficient in operation.

BRIEF SUMMARY OF THE INVENTION

The foregoing objects may be achieved by a combination including a flange and a pipe positioned relative to one another for welding of the flange to the pipe. At least a first flange hole and a second flange hole extend through the flange. A stationary support platform having a plurality of pin holes extending therethrough has an upper surface. The flange is supported on the upper surface of the support platform with the first and second flange holes registered with the first and second pin holes respectively. At least a first pin and a second pin each have an upper end and each are contained within one of the pin holes in the support frame. They are moveable within the pin holes from a retracted position to an extended position wherein the upper ends of the first and second pins are spaced above the upper surface of the support platform and are within the first and second flange holes respectively of the flange. A plurality of clamps are moveable with respect to the upper surface of the support platform from an unclamped position to a clamped position retentively clamping the flange to the upper surface of the support platform. A pusher is connected to the first and second pins for moving the first and second pins between their respective retracted and extended positions. The pusher is also connected to the plurality of clamps for moving the plurality of clamps between their respective unclamped and clamped positions.

According to another feature of the present invention the pusher permits relative motion between the first and second pins and the plurality of clamps as the pusher moves the first and second pins and the plurality of clamps between their respective retracted and extended positions and their unclamped and clamped positions.

According to another feature of the present invention a spring is between plurality of clamps and the first and second pins for urging the first and second pins away from the plurality of clamps.

According to another feature of the present invention a pin holder holds the first and second pins and a spider holds the plurality of clamps. The spring is located between the pin holder and the spider.

According to another feature of the present invention an adjustment mechanism is mounted on the pusher for adjusting the position of the first and second pins and the clamps relative to the stationary platform.

The foregoing objects may be achieved by a method for locating the flange to weld it to a pipe. The method comprises placing at least a first pin and a second pin within a first pin hole and a second pin hole respectively extending through a stationary platform having an upper platform surface. Next a flange is positioned on the support platform. The flange includes at least a first flange hole and a second flange hole registered with the first and second pin holes respectively. The flange is located on the upper platform surface by extending the first and second pins into the first and second flange holes respectively of the flange. The flange is then clamped to the upper surface of the platform with a plurality of clamps. The method includes moving a pusher connected to both the first and second pins and the plurality of clamps to accomplish the extending and clamping steps.

According to another feature of the present invention the first and second pins are connected to a pin holder and a plurality of clamps are connected to a spider. The pusher is connected to both the pin holder and the spider and the method further comprises moving the pusher in a single motion to move the pin holder and the spider.

According to another feature of the method of the present invention the plurality of clamps are engaged with a plurality of cams to cause the clamps to move into engagement with the flange during the clamping step.

According to another feature of the present invention the flange is moved into engagement with two repositioning members on the platform during the positioning step.

DETAILED DESCRIPTION OF THE PREFERRED EMBODIMENT

Figure 1:
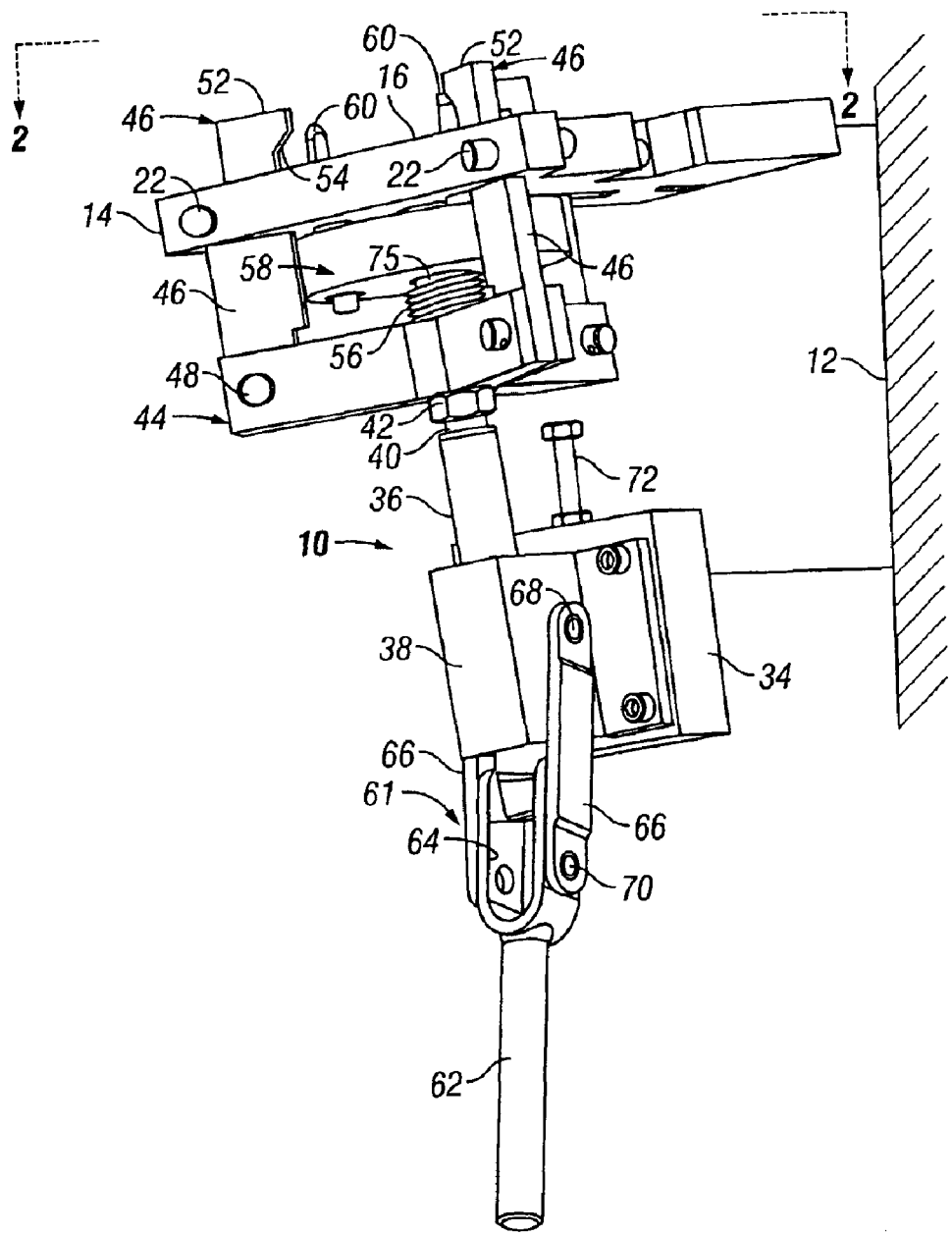
FIG. 1 is a perspective view of the apparatus for locating and holding a flange.
Figure 2:
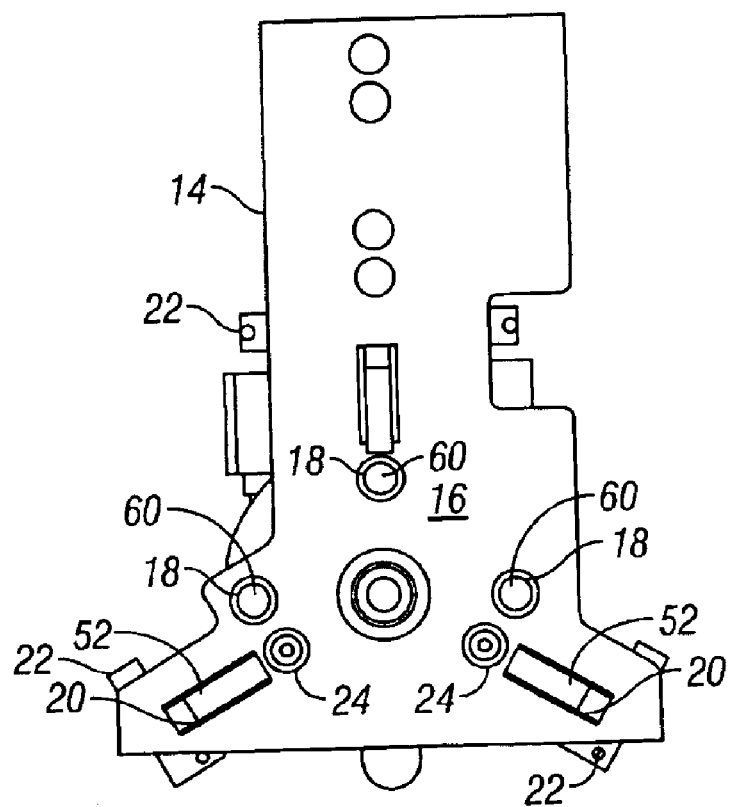
FIG. 2 is a top plan view of the device of FIG. 1 taken along line 2—2 of FIG. 1.
Figure 5:
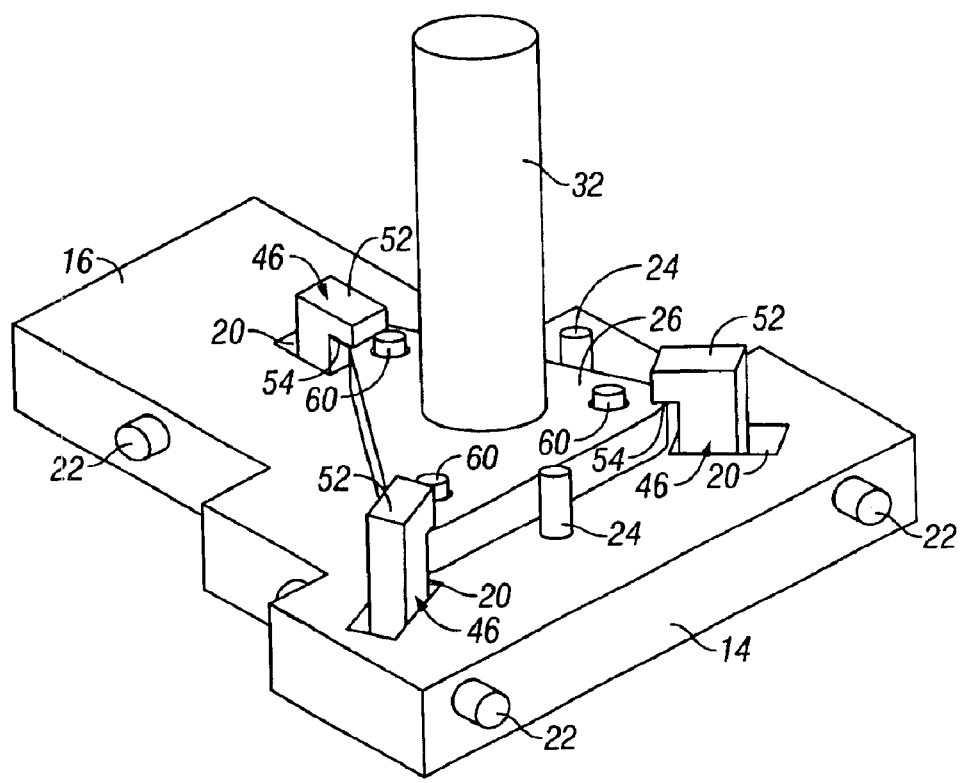
FIG. 5 is a perspective view showing the assembled flange with the locating pins extending through the holes in the flange and with the clamps clamping the flange to the upper surface of the apparatus for locating and holding a flange.
Figure 6:
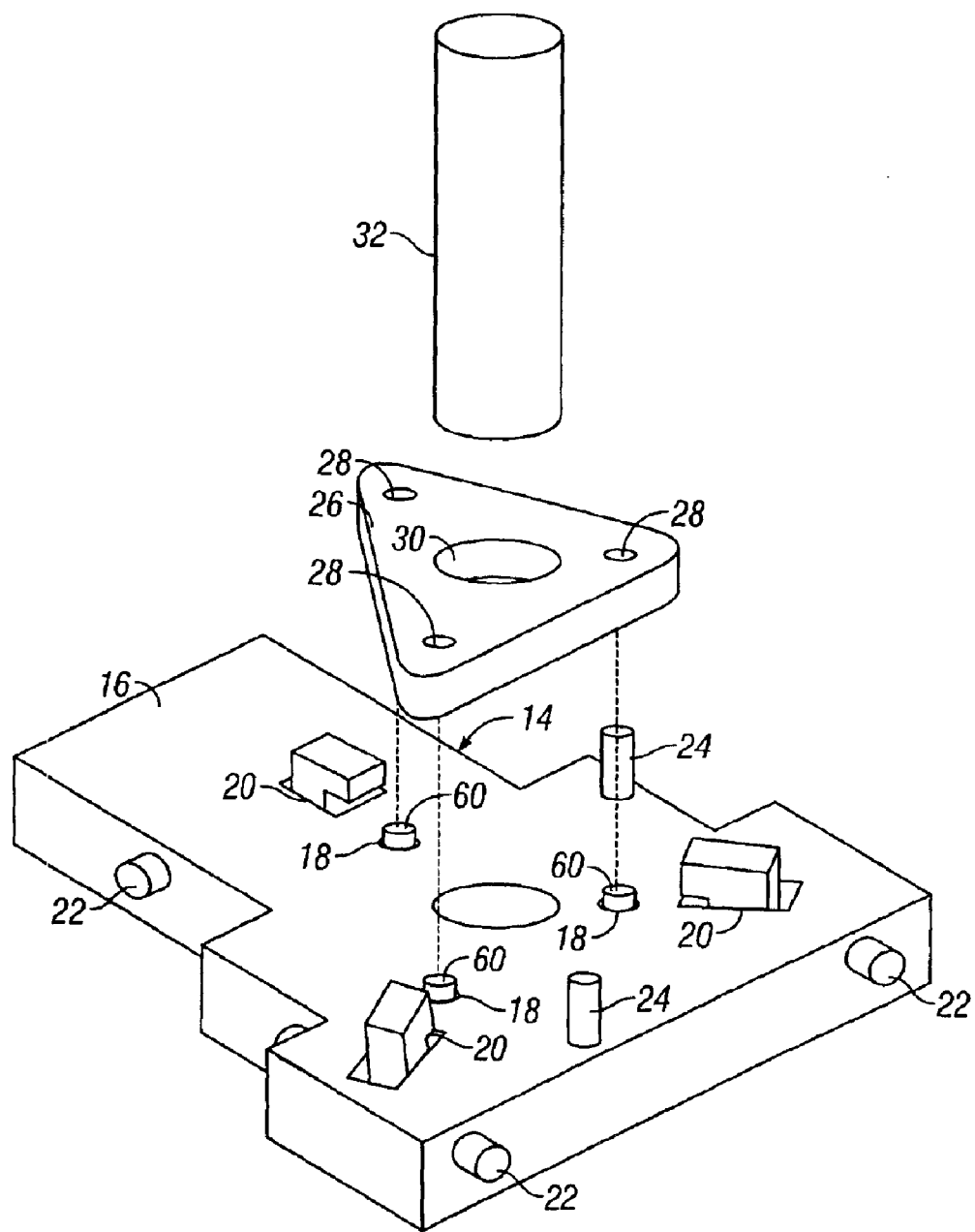
FIG. 6 is an exploded perspective view of the flange and the upper surface of the apparatus for locating and holding the flange.

Referring to FIG. 1 the numeral 10 generally designates the apparatus for locating and holding a flange. Apparatus 10 is mounted to a support frame 12 as shown schematically in FIG. 1. Attached to the support frame 12 are a stationary platform 14 and a stationary pusher support 34. Platform 14 includes an upper surface 16. Extending through the platform 14 and in communication with the upper surface 16 are a plurality of upstanding pin holes 18 (FIGS. 2, 5 and 6). The platform 14 is also provided with a plurality of rectangularly shaped clamp holes 20 and includes associated with each clamp hole 20 a roller cam 22 that is in communication with the interior of the clamp hole 20. At least two prelocating members 24 protrude upwardly from the upper surface 16 of platform 14.

A flange 26 includes a plurality of flange holes 28 which are configured in such a manner as to be registrable above the pin holes 18. Centrally located in the flange 26 is a pipe receiving hole 30 which is adapted to frictionally receive a pipe 32 for welding the pipe 32 to the flange 26.

A pusher rod 36 is mounted for movement within a pusher mount 38 and is adapted to slide longitudinally therein. The pusher rod 36 includes a threaded upper end 40 and an adjustment nut 42 threaded thereon.

A spider 44 includes a central opening that is fitted for sliding movement over the threaded upper end 40 of pusher rod 36. Spider 44 rests against the adjustment nut 42 to limit its downward movement. Spider 44 includes a plurality of clamp arms 46 mounted adjacent its outer periphery. Each of the clamp arms 46 is pivotally mounted at 48 for pivotal movement about a pivot axis for the clamp arms 46. Each clamp arm 46 includes a cam follower surface 50 (FIG. 3) which is adapted to roll against the roller cams 22 within the clamp holes 20 in platform 14. The upper ends of each clamp arm include a clamp finger 52 and a beveled clamp surface 54. The pusher rod 36 extends above the spider 44 and includes an intermediate pusher shaft 56 thereabove.

Attached to the upper end of the intermediate pusher shaft 56 is a pin holder 58 which holds a plurality of pins 60. The pins 60 are fitted within the pin holes 18 of the upper surface 16 of platform 14. The pins 60 are moveable from a retracted position shown in FIGS. 3 and 6 to an extended position shown in FIGS. 1, 4 and 5.

Figure 3:
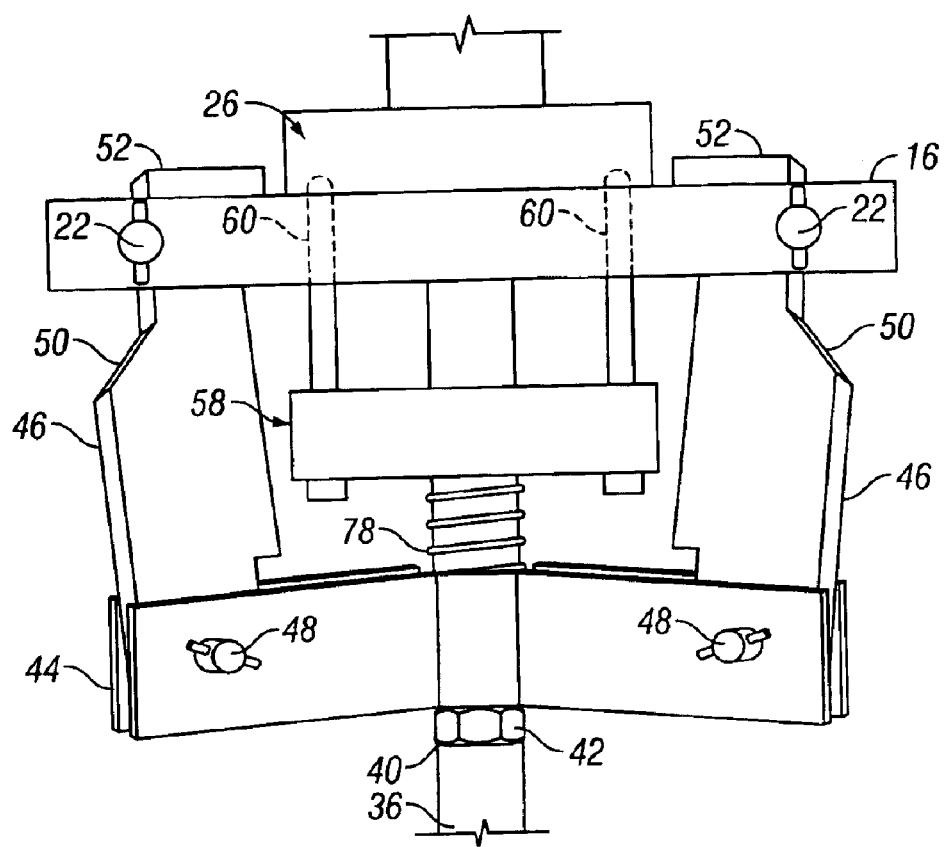
FIG. 3 is a front elevational view of the device showing the locating pins in a retracted position and showing the clamps in an unclamped position.
Figure 4:
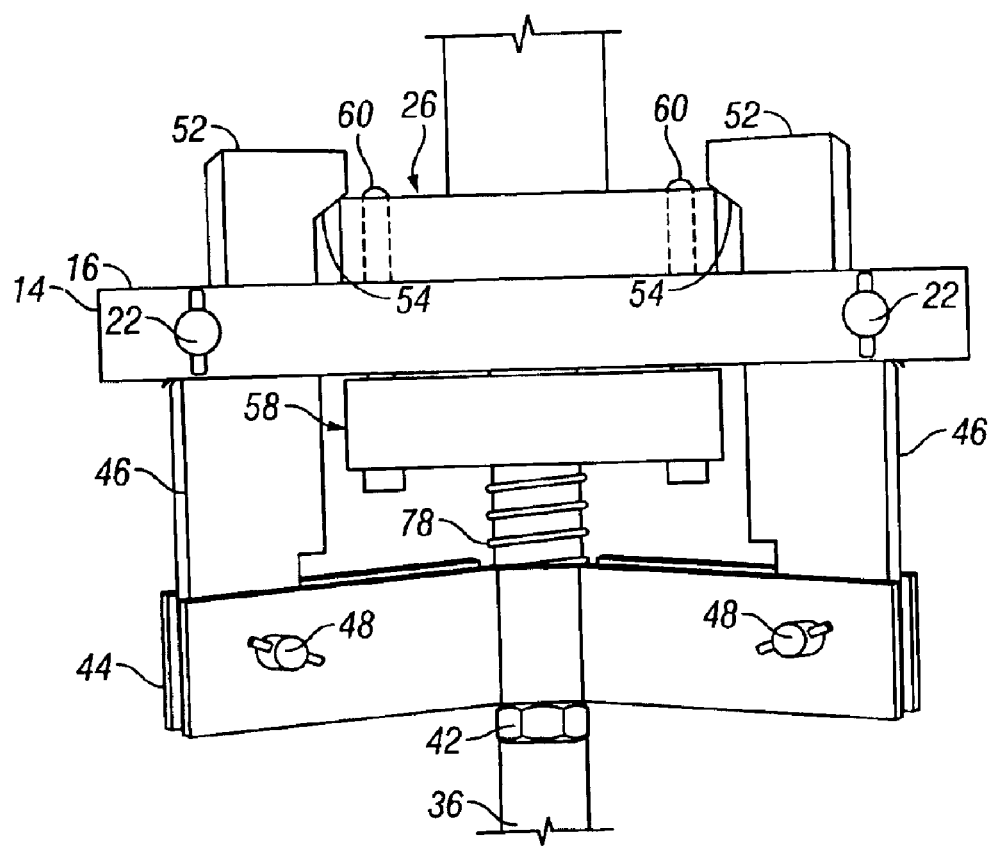
FIG. 4 is a view similar to FIG. 3, but showing the locating pins in their fully extended position and the clamps in their clamped position.

Similarly cam surfaces 50 of clamp arms 46 are adapted to cam against the roller cams 22 from an unclamped position shown in FIGS. 3 and 6 to a clamped position shown in FIGS. 1, 4 and 5.

The apparatus for moving the pusher 36 is shown in FIG. 1 to be a manually operated toggle linkage 61 comprising a lever 62 having a U-shaped yoke 64 which is pivotally mounted to the lower end of pusher rod 36. A pair of toggle links 66 are pivoted at their upper ends about a pivotal axis 68 to the pusher mount 38 and are pivoted at their lower ends for pivotal movement about an axis 70 to the U-shaped yoke 64. Thus the lever 62 is pivotal in a clockwise direction from the position shown in FIG. 1 to a more articulated position which retracts the pusher rod 36 downwardly relative to the pusher mount 38 and relative to the platform 14. Pivoting the handle 62 back to the position shown in FIG. 1 causes upward extension of the pusher rod 36.

Because pusher rod 36 is connected to both the yoke 44 and the pin holder 58, it causes the yoke 44 and the pin holder 58 to move from a lower position shown in FIGS. 3 and 6 to an upper most position shown in FIGS. 1, 4, and 5. For purposes of description the pin holder 58 is in its lower most or retracted position shown in FIG. 3 and is in its extended or upper most position in FIGS. 1, 4 and 5. Similarly the spider 44 is in its first or lower most position in FIG. 3 and is in its second or upper most position in FIGS. 1, 4 and 5.

A spring 78 is compressed between the pin holder 58 and the spider 44 and urges the two apart from one another. The spider 44 is capable of slight tilting movement and vertical movement on the shaft 36 for reasons more fully described hereafter.

A stop 72 is provided on the pusher mount 38 for limiting the downward movement of the spider 44 as it moves to its lower most or first position shown in FIGS. 3 and 6.

The method of the present invention comprises positioning the flange 26 on the upper surface 16 of the platform 14. The position of the flange 26 can be generally made by positioning the flange 26 between the prelocating members 24 which as shown in FIG. 5 are upstanding rigid pins. This generally locates the flange 26 with the flange holes 28 in registered alignment above the pin holes 18.

Next the toggle linkage 61 is moved from its articulated position to its less articulated position shown in FIG. 1 so as to extend the pusher rod 36 in an upward direction. This causes the pins 60 to slide upwardly within the flange holes 28 to the position shown in FIG. 5. At the same time, the spider 44 is moved upwardly from its initial lower most position to its upper most position shown in FIGS. 1, 4 and 5. In this position the clamp arms 46 engage the roller cams 22 with the canted cam follower surfaces 50 so as to cause the clamp arms to move radially inwardly toward the clamp. This causes the clamps to engage the upper surface of the flange and clamp it tightly against the upper surface of the support platform as shown in FIG. 6. Tolerances or variations in the thickness of the flange 26 are accommodated by the lost motion between the pin holder 58 and the spider 44. Also the spider 44 is capable of slight tilting action about the longitudinal axis provided by the sliding movement of the spider 44 on the pusher rod 36. This enables all three of the clamp arms 46 to become tightly retentively engaged over the clamp 26. The exhaust pipe 32 is inserted into the pipe receiving hole 30 for welding.

When the welding operation is complete, the toggle 62 is moved to its more articulated position so as to cause the pusher rod 36 to be retracted within the pusher mount 38 thereby causing the several clamp surfaces 54 to move outwardly away from retentive engagement with the flange 26 and causing the pins 60 to withdraw from the flange holes 28 in the flange 26.

Figure 7:
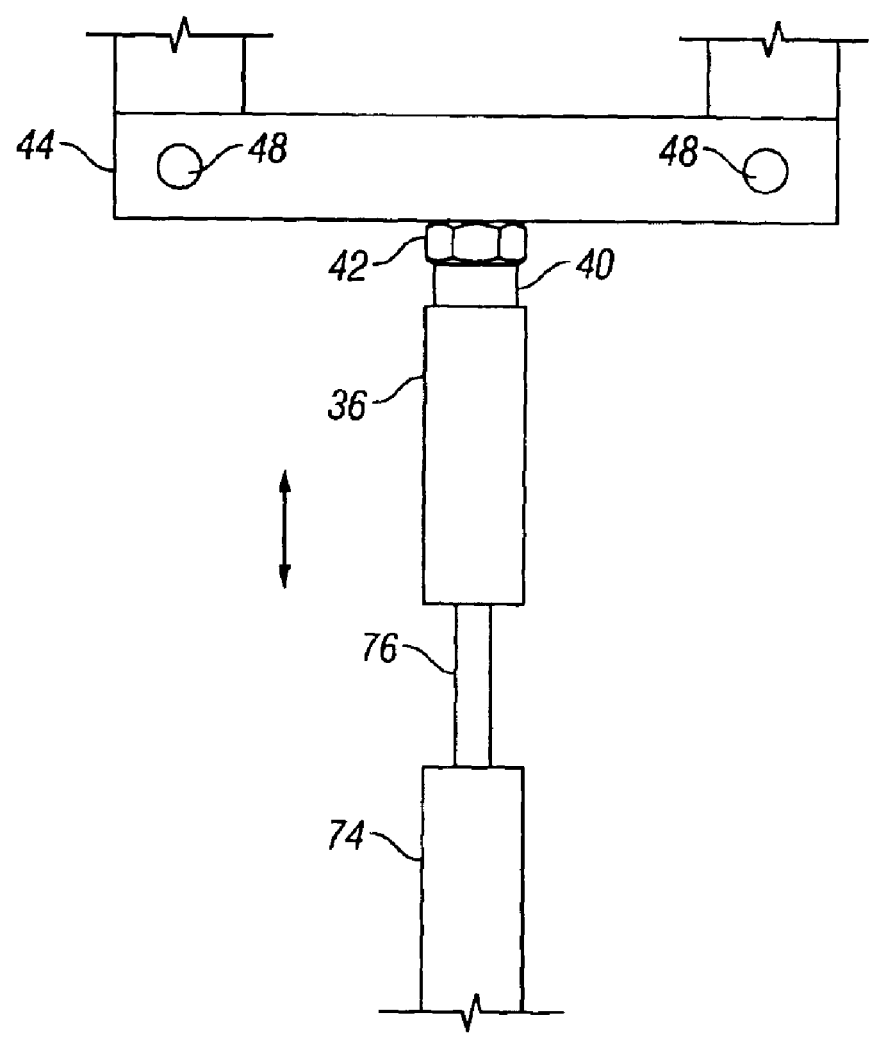
FIG. 7 is a partial view of an alternative device for pushing the apparatus for locating and holding a flange.

FIG. 7 shows an alternative method for actuating the movement of the pusher rod 36. An extendible cylinder 74 having a rod and piston assembly 76 therein is capable of actuating this longitudinal movement. The cylinder 74 and the rod 76 can be pneumatic or hydraulic. Other means of actuating the movement of the pusher 36 can be used without detracting from the invention.

The present invention accomplishes the clamping action and the locating action with a single motion of the pusher rod 36. This is due to the fact that the pusher rod 36 is connected both to the pins 60 and to the clamp arms 46 so that a single movement of the pusher 36 causes movement of both the clamp arms 46 and the pins 60.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. Apparatus for locating and grasping a flange while welding a flange to a pipe, at least a first flange hole and a second flange hole extending through the flange, the apparatus comprising:
   a stationary platform having an upper surface, at least a first platform hole and a second platform hole arranged to register with the first flange hole and the second flange hole of the flange;
   a stationary tool support;
   a pin holder mounted to the tool support for movement between a retracted position and an extended position;
   at least a first pin and a second pin attached to the pin holder and positioned within the first and second platform holes respectively, the first pin and the second pin moving upwardly beyond the upper surface of the platform when the pin holder moves to the extended position;
   a spider having a plurality of clamp members movably mounted thereon, the spider being movable from a first position to a second position;
   a pusher connected to the spider and the pin holder for moving the spider between the first and second positions, and for moving the pin holder between the retracted and extended positions;
   a plurality of cams on the tool support, each positioned to cam against one of the plurality of clamp members for causing the clamp members to move into a clamped position engaging and grasping the flange to hold the flange against movement on the upper surface of the stationary platform whenever the spider is moved to its second position.

2. The apparatus of claim 1 and further comprising a plurality of clamp holes extending through the tool support, each of the clamps extending through one of the plurality of clamp holes and protruding above the upper surface of the stationary platform when the spider is in the second position.

3. The apparatus of claim 1 and further comprising the spider and the pin holder being connected to the pusher for relative movement there between, a spring being positioned between the spider and the pin holder and urging the pin holder away from the spider.

4. The apparatus of claim 1 and further comprising a stop on the tool support for engaging the spider and preventing movement of the spider beyond the first position when the spider is moving from the second position to the first position.

5. The apparatus of claim 1 wherein the pusher is a toggle linkage.

6. The apparatus of claim 1 wherein the pusher is an extensible cylinder and cylinder rod.

7. Apparatus for locating and grasping a flange while welding a flange to a pipe, at least a first flange hole and a second flange hole extending through the flange, the apparatus comprising:
   a stationary support platform having a plurality of pin holes extending there through and having an upper surface for supporting the flange with the first and second flange holes registered with the first and second pin holes respectively;
   a first pin and a second pin each having an upper pin end and a lower pin end, the first and second pins being contained within one of the pin holes in the support platform for movement therein from a retracted position to an extended position wherein the upper pin ends are spaced above the upper surface of the support platform:
   a spider containing a plurality of clamps movable mounted thereon, the spider being movable with respect to the upper surface of the support platform from an unclamped position to a clamped position wherein the plurality of clamps retentively clamp the flange to the upper surface of the support platform;
   a pusher movable to drive the first and second pins between their respective retracted and extended positions and simultaneously to drive the spider between the unclamped and clamped positions.

8. The apparatus of claim 7 wherein the pusher permits relative motion between the first and second pins and the spider as the pusher moves the first and second pins and the spider between the respective retracted and extended positions and the respective unclamped and clamped positions.

9. The apparatus of claim 7 wherein a spring is between the first and second pins and the spider and the spring yieldably urges the first and second pins away from the spider.

10. The apparatus of claim 7 wherein the pusher includes an adjustment mechanism for adjusting the position of the first and second pins and the clamps relative to the stationary platform.

11. The apparatus of claim 7 wherein the flange includes a third flange hole, the support platform includes a third pin hole, and the third pin is positioned within the third pin hole and is movable in unison with the first and second pins to an extended position within the third flange hole.

12. The apparatus of claim 7 and further comprising a plurality of cams, each engaging one of the plurality of clamps to cam the one clamp from the unclamped position to the clamped position in response to the movement of the pusher.

13. Apparatus for locating and grasping a flange while welding a flange to a pipe, at least a first flange hole and a second flange hole extending through the flange, the apparatus comprising: a stationary support platform having an upper surface for supporting the flange;
   a first pin and a second pin each having an upper pin end and a lower pin end, the first and second pins being movable with respect to the support platform from a retracted position to an extended position wherein the upper pin ends are spaced above the upper surface of the support platform and protrude within the first and second flange holes of the flange;
   a spider containing a plurality of clamps movable mounted thereon, the spider being movable with respect to the upper surface of the support platform from aim unclamped position to a clamped position wherein the plurality of clamps retentively clamp the flange to the upper surface of the support platform;
   a pusher movable to drive the first and second pins between their respective retracted and extended positions and simultaneously to drive the spider between the unclamped and clamped positions.

* * * * *

UNITED STATES PATENT AND TRADEMARK OFFICE
CERTIFICATE OF CORRECTION

PATENT NO. : 6,953,142 B2 Page 1 of 1
DATED : October 11, 2005
INVENTOR(S) : Pingilley et al.

It is certified that error appears in the above-identified patent and that said Letters Patent is hereby corrected as shown below:

<u>Column 6,</u>
Line 58, should read -- from an unclamped position to a clamped position --.

Signed and Sealed this

Thirteenth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,953,142 B2
DATED : October 11, 2005
INVENTOR(S) : Pingilley et al.

It is certified that error appears in the above-identified patent and that said Letters Patent is hereby corrected as shown below:

<u>Title page,</u>
Item [73], Assignee, should read -- Genesis System group, LLC --.

Signed and Sealed this

Twenty-eighth Day of March, 2006

JON W. DUDAS
*Director of the United States Patent and Trademark Office*